J. Eck,

Tug Hook.

No. 90,938.   Patented June 8, 1869.

Witnesses.
Jno. S. Slater
Frank A. Jackson

Inventor;
John Eck
By his Atty
Wm. C. Wood.

JOHN ECK, OF MEDORA, INDIANA.

Letters Patent No. 90,938, dated June 8, 1869.

---

IMPROVED TUG-HOOK.

---

The Schedule referred to in these Letters Patent and making part of the same.

---

*To all whom it may concern:*

Be it known that I, JOHN ECK, of Medora, in the county of Jackson, and State of Indiana, have invented a certain new and useful Safety Trace-Hook; and I do hereby declare the following specification, taken in connection with the drawings furnished and forming a part of the same, to be a true, clear, and correct description thereof.

Figure 1:
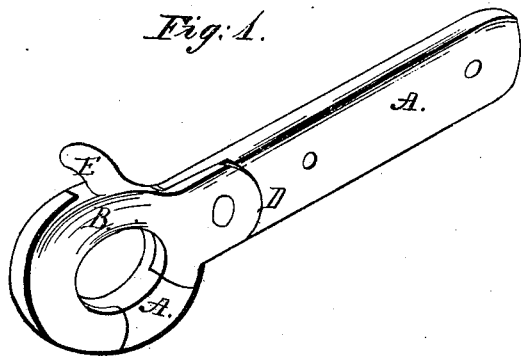
Figure 2:
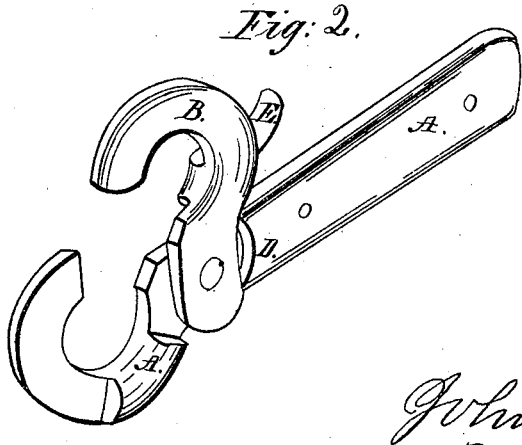

Figure 1, in the drawings, shows my safety trace-hook complete, with the movable jaw open, its position, when closed, being indicated by the dotted lines in red.

A is the shank, to be fastened to the tug-leather by rivets or other suitable means, and upon one end of which is turned a hook, as seen in the drawings.

This hook makes a curve of about three-fourths of the circumference of a circle, and forms, in connection with the hook B, riveted to the shank A at D, a double hook, which assumes the form of an iron eyelet, when closed, with an aperture slightly oval.

E is a horn or stud projecting from B, to facilitate opening the hooks.

Having thus described my invention,

What I claim as new, and for which I desire to secure Letters Patent, is—

The improved safety trace-hook herein described, consisting of the parts A and B, constructed and operating substantially as set forth.

JOHN ECK.

Witnesses:
WILLIAM F. JULIAN,
MATHEW W. TANNER.